United States Patent [19]

Howard

[11] Patent Number: 5,527,053
[45] Date of Patent: Jun. 18, 1996

[54] DETENT CENTERING COMPENSATOR FOR VEHICLE STEERING SYSTEMS

[76] Inventor: Durrell U. Howard, 306 Krameria Dr., San Antonio, Tex. 78213

[21] Appl. No.: 294,839

[22] Filed: Aug. 29, 1994

[51] Int. Cl.[6] ........................................ B62D 6/00
[52] U.S. Cl. .................. 280/90; 280/94; 180/421
[58] Field of Search ............................ 180/79, 132, 141, 180/142, 143, 140; 280/94, 89, 90; 74/388 PS

[56] References Cited

U.S. PATENT DOCUMENTS

| | | | |
|---|---|---|---|
| 3,848,886 | 11/1974 | Hefren | 280/94 |
| 3,882,953 | 5/1975 | Maisch | 180/79.2 |
| 3,882,954 | 5/1975 | Inoue | 180/79.2 |
| 3,897,846 | 8/1975 | Inoue | 180/79.2 |
| 3,958,656 | 3/1976 | Niemann | 180/77.1 |
| 3,961,804 | 6/1976 | Blanton | 280/94 |
| 4,213,626 | 7/1980 | Moore | 280/94 |
| 4,353,568 | 10/1982 | Boyce | 280/94 |
| 4,406,473 | 9/1983 | Sexton | 280/94 |
| 4,410,193 | 10/1993 | Howard | 280/90 |
| 4,415,054 | 11/1983 | Drutchas | 180/79.1 |
| 4,418,931 | 12/1983 | Howard | 280/94 |
| 4,467,884 | 8/1984 | Robertson et al. | 180/90 |
| 4,534,577 | 8/1985 | Howard | 280/94 |
| 4,553,768 | 11/1985 | Furukawa et al. | 280/91 |
| 4,588,198 | 5/1986 | Kanazawa et al. | 280/90 |
| 4,603,873 | 8/1986 | Perlini | 280/94 |
| 4,666,014 | 5/1987 | Carlson et al. | 180/148 |
| 4,697,817 | 10/1987 | Jefferson | 280/94 |
| 4,722,545 | 2/1988 | Gretz et al. | 280/771 |
| 4,758,012 | 7/1988 | Ogura et al. | 180/143 |
| 4,828,063 | 5/1989 | Ogura et al. | 180/140 |
| 4,925,165 | 5/1990 | Sketo | 267/221 |
| 5,156,229 | 10/1992 | Yasui et al. | 280/91 |

FOREIGN PATENT DOCUMENTS

58-110372  6/1983  Japan ........................... 280/94

*Primary Examiner*—Margaret A. Focarino
*Assistant Examiner*—Victor E. Johnson
*Attorney, Agent, or Firm*—Pollock, Vande Sande & Priddy

[57] ABSTRACT

A compensating apparatus resists movement of the steered wheels of a vehicle to either side of a selected center position, and returns them to this center position after such movement. The apparatus includes a cam member connected to the steered wheels for movement therewith and having a cam surface with a centering depression. A follower member is pivotally mounted on one end of an elongated rocker member and may be received in the centering depression to define the center position. An actuator assembly applies a resilient force against the other end of the rocker member to press the follower member into the centering depression in response to the pressing of a resilient mechanism by a fluid pressure system. The amount of the resilient force may be varied remotely either by the driver during vehicle operation or automatically in response to vehicle speed. The center position also may be changed during vehicle operation.

20 Claims, 5 Drawing Sheets

DETENT CENTERING COMPENSATOR FOR VEHICLE STEERING SYSTEMS

FIELD OF THE INVENTION

This invention relates to vehicle steering systems and more particularly to a centering device for controlling the steerable wheels of a vehicle such as a motor home, bus, truck, automobile or the like so that a center steering position is selected and maintained in spite of spurious steering inputs, such as those caused by variable crosswinds, crown curvature or slant of the highway, or other factors tending to adversely affect vehicle steering by the driver.

BACKGROUND OF THE INVENTION

The steering systems of highway vehicles and the like are designed primarily for driver control. In these systems, the steering force required on the steering wheel and the ratio between steering wheel movement and movement of the steerable ground wheels depend upon the characteristics of the particular vehicle and the conditions under which it will usually be operated. A wide variety of extraneous forces can act on a vehicle steering system and spurious steering inputs caused by these forces must be dealt with satisfactorily in order to provide stable and controllable steering of a vehicle. As vehicle speed increases, the effects of any spurious steering inputs are magnified, making it necessary for the driver to exercise more precise and careful driving control.

Vehicles with steering systems having positive caster generally track relatively straight ahead and generally resist normal steering inputs away from center, including those of the driver. Intentional turning maneuvers by the driver therefore require sufficient turning force to overcome this positive resistance to movement away from center.. When the driver relaxes the turning force applied to the steering wheel, a positive caster system has a definite tendency to return to its straight ahead position, although it may overshoot the neutral or center position if the steering wheel is entirely released.

However, with such conventional steering, the smallest amount of erratic steerable wheel movement is passed on directly to the driver who must provide counter-active corrections through the steering wheel. The negative action of the steerable wheels is caused by spurious steering inputs from crosswinds, slanted or crown roads, bad road surfaces, and other adverse dynamic steering forces. Inherent geometric steering characteristics may also be responsible for spurious steering inputs.

In other words, when the steered wheels are not able to hold a straight line, the problem is passed back through the system for driver correction. The result of such unruly behavior of the steerable wheels is known as "road wander". Heavy vehicle drivers know about road wander, crosswind steering, and steering wheel pull; and so does every front end specialist who must endeavor to solve these built-in problems.

While positive caster is desirable in some respects, it is not without compromises over the full steering spectrum. For example, the adverse effects of strong gusty cross winds are usually more pronounced with positive caster. As its name would imply, the vehicle tends to caster towards the side of the roadway to which it is being pushed by the wind. Similarly, a high crown at the center of the roadway or a slanted roadway can cause vehicles to turn toward the edge of the roadway, that is, in the downhill direction. In addition, generous positive caster provides significant resistance to small radius turns, which can make city driving quite fatiguing. These three adverse effects are some of the negative aspects of achieving steering stability through generous amounts of positive caster.

On the plus side, motor vehicles with positive caster are less fatiguing to drive over long distances and are safer and more controllable at highway speeds, as compared to vehicles without caster or with negative caster. This is because, by tracking straight, virtually no driver effort is required to keep a positive caster vehicle from swerving unless one of the foregoing sources of extraneous forces are present.

Another drawback of prior art steering systems is that spurious inputs transmitted from the roadway through the steerable wheels affect substantially the entire steering assembly before encountering any stabilizing resistance from the steering wheel. The transmission of these various inputs between the steerable wheels and the steering wheel causes the inter-connecting components of the steering system to repeatedly oscillate between states of tension and compression. Such oscillations cause wear and slack in ball joints and other connections and have long been considered a primary source of stress fatigue which can lead to premature failure of various steering system components. Mechanical slack due to worn parts can also be a cause of steering system oscillations and vehicle wandering that require constant corrections and therefore produce driver fatigue.

The ideal driving situation is therefore one where the steering system inherently causes the vehicle to travel in an unswerving straight line unless the driver intentionally turns the vehicle in another direction. Thus, the ideal steering system would require relatively little attention from the driver as the vehicle progresses along a straight line path down the roadway. From a steering standpoint, the vehicle should not respond to anything but the driver's steering commands and these must be of sufficient magnitude to overcome a significant resistance to turning away from center. In the absence of a steering input by the driver, the vehicle should literally do nothing but progress straight ahead.

SUMMARY OF THE INVENTION

The invention provides improved on-center control of the steerable wheels, and significantly reduces driver fatigue because it results in a major reduction in driver steering inputs. This is accomplished by allowing the driver to easily make small adjustments in the centered position of the steering system to fine tune steering of the vehicle during its operation. Fine tuning can only be made while driving, and makes driving more pleasurable and less fatiguing. It also prevents unnecessary trips to a front-end shop.

The invention thus comprises a centering compensator having a center position which is remotely adjustable to permit the driver of the vehicle to change and reset the center position of the steering system to compensate for new or changed steering forces which would otherwise cause the vehicle to deviate from its straight ahead course. Such changes in the center position of the steering system may be necessitated by component wear, in addition to changes in the external forces acting upon the vehicle or its steerable wheels as described below. Even a change of tires may necessitate a change in the center position of the steering system to achieve straight ahead travel of the vehicle. Remote adjustment permits the center position maintained by the compensator to be fine tuned while the vehicle is in operation from a location near the driver, which is "remote" relative to the location at which the compensator is connected to the steering system of the vehicle.

When a driver turns the steering wheel of modern over-the-road vehicles, power steering does the work. If these vehicles utilize the present invention and the steering wheel is released, the centering compensator goes to work and makes the steered wheels track straight with great accuracy by counteracting spurious steering inputs as described below.

Gusty crosswinds cause the castered front wheels of a motor vehicle to steer downwind requiring constant driver corrections. With the centering compensator to stabilize the front wheels and to hold a straight course, crosswind driving is dramatically improved. In addition, use of the compensator permits a substantial reduction in the caster angle of vehicles with positive caster, thereby significantly reducing the crosswind effect.

When driving on a crowned or slanted road, the driver must hold against wheel pull mile after mile. The culprit here is the hundred year old steering geometry that is responsible for the automatic, never failing pull to the low side of the roadway. With the present invention, the driver easily trims out such steering wheel pull by the simple touch of a trim switch.

Because of their high-roll center dynamics, trucks, buses, motorhomes and other large vehicles are especially susceptible to a condition known as "dynamic sway". Dynamic sway is caused by steered wheels that will not hold a straight line because of vehicle geometry. Attempts to solve this steering problem have universally been made by making the chassis stiffer in the roll axis. However, there are practical limits to how rigid the roll axis can be made. There are no limits, however, to how straight a vehicle can be made to track. With the stabilized, on-center straight track steering provided by the present invention, the ultimate in sway control can be achieved. The reduction in the sway of buses and motorhomes means that passengers can move about without being thrown off balance, and those with a tendency for motion sickness will be more able to enjoy the pleasures of road vehicle travel.

Road wander is similar to dynamic sway in that it is caused by steered wheels that are not holding a dedicated straight line. It may be caused by wear or slack in the steering system and, where power steering is used, because of dead space travel of the power steering valve before it opens the fluid ports of the power steering unit. When the steered wheels wander, the problem is passed on to the driver causing constant steering corrections. This problem is also cured by the present invention which provides precision centered steerable wheels that track super straight, preventing unstable wheel behavior that causes road wander. The invention is also capable of generating sufficient compensating forces to properly control steering with offset wheels having oversized tires.

The centering compensator of the invention provides remotely adjustable levels of resistance for opposing off-center steering movements and of centering force for returning the steering system to its center position after a turning movement. The adjustment means provides for different levels of steering force to initiate or breakaway into a steering movement away from center. This level of force is sometimes referred to in this specification as the "break away" or resistance force. Different levels of break away resistance may be appropriate to compensate for different steering system characteristics on the same or different types of vehicles and/or for changes in the forces acting upon the vehicle. The level of break away resistance to movement away from center may be remotely adjusted either by a control mechanism operable by the driver or by a speed control mechanism responsive to the speed of the vehicle.

The level of centering force for returning the steering system to center may also be remotely adjusted either by a control mechanism operable by the driver or by a speed control mechanism responsive to the speed of the vehicle. Both the resistance force and the centering force provided by the centering compensator are increased or decreased to provide a level of force sufficient to overcome any spurious steering inputs and to suit driver road feel, particularly a feel of the steering wheel that lets the driver know when the steered wheels are beginning to move away from center and are closely approaching return to center.

The centering compensator may be left on continuously because it will automatically turn off with the ignition and come back on when the engine is started. With any malfunction of the vehicle's power steering, an automatic disabling feature of the invention shuts the compensator completely off.

In order to effectively resist spurious wheel movements and prevent such spurious inputs from reaching the steering gear and other steering components located between the tie rod and the steering wheel, the compensator of the present invention is connected downstream of the steering gear on the slow side of its ratio. The steerable wheels are therefore maintained in their straight ahead position irrespective of any spurious inputs or mechanical slack that may be present in the upstream, fast ratio portion of the steering assembly. In the absence of the compensator, such spurious inputs to and/or mechanical slack in the steering assembly require almost constant manipulation of the steering wheel by the driver and make it almost impossible for the driver to hold the vehicle on a true straight ahead course.

To properly compensate for the various adverse steering forces and inputs that may be encountered during operation of a vehicle, the centering compensator of the present invention therefore includes the following features:

(a) Dynamic resistance force opposing turning movement away from either side of a preselected center position, the amount of resistance force being sufficiently large to prevent such turning moments in response to spurious inputs from either the steerable wheels or the steering wheel but sufficiently small to allow intentionally created turning inputs to be transmitted from the steering wheel to the steerable wheels.

(b) Dynamic centering force toward the center position from either side of center, the amount of centering force from either side of center being sufficiently large to override spurious steering inputs tending to cause turning movements away from center.

(c) Remotely operated means for initializing and varying the resistance force and the centering force to permit the driver to selectively activate and fine tune these forces while the vehicle is in operation so as to satisfy driver road feel preferences and to adequately compensate for changes in driving conditions and steering system characteristics.

(d) Remotely operated trimming means to permit the driver to selectively vary and fine tune the preselected center position with great accuracy while the vehicle is in operation so as to precisely compensate for changes in driving conditions and steering system characteristics tending to alter forward movement of the vehicle away from a true straight ahead course.

(e) Precision centering with no substantial overshoot past center when the steering system returns to a preselected center position.

(f) Free return to the center position from either side of center.

(g) Fail-safe mode for rendering the centering compensator inoperative so that it in no way affects movement of the steering system if the vehicle's power steering unit has failed or is otherwise inoperative.

(h) Precision centering independent of mechanical slack in the reduction gear, power steering unit, and/or other steering system components between the pitman arm and the steering wheel.

(i) Slack-free trimming of center position.

(j) Damping of erratic steering movements, at least near the center position.

(k) Retrofitting of existing vehicles.

(l) Relatively little space required for installation.

(m) Centering assistance for vehicles with or without power steering systems.

(n) Resistance and centering forces through a predetermined range of turning movement to either side of the center position.

(o) Distinctive driver road feel, including a sufficient feel through the steering wheel to let the driver know when the steered wheels are beginning to move away from center and are closely approaching return to center.

The preferred embodiments of the invention therefore have the features (a) through (o) listed above, namely, resistance force for opposing steering movement away from center and centering force for return to center sufficient to overcome spurious steering inputs, remotely variable level of resistance force and centering force through a predetermined range of turning movement, remotely trimmable center position, no substantial overshoot, free return to center position, fail-safe mode for disabling the compensator in the absence of power steering, precision and slack-free centering, slack free trimming, damping of erratic steering movements, compact size, utility for old and new vehicles with or without power steering, and distinctive driver road feel.

It follows that a principal object of the present invention is to provide a centering compensator having the foregoing features and attachable to a vehicle steering system to reduce automatically the driver inputs required to maintain a preselected straight ahead course for the vehicle. To accomplish this, the present invention offsets spurious steering inputs with an opposing resistance force sufficient to keep the steerable wheels or other steering member in a preselected center position for maintaining straight ahead vehicle travel. Accurately holding the steerable wheels on center prevents road wander, slanted road steering wheel pull, steering over-control, crosswind steering effect, and steering induced dynamic sway. Improvement in rutted road steering may also be realized. The positive centering feature gives the steering system designer greater latitude in reducing the caster angle of the king pin, which reduces the crosswind steering effect.

The manner in which the present invention accomplishes the foregoing objectives and advantages will now be described. The compensator comprises a housing assembly enclosing a chamber for housing a cam means, a cam follower means, and an actuator means for actuating the cam follower. The cam means includes a cam member which is preferably pie-shaped and has an outer cam surface extending around at least a portion of its outer periphery. The cam member is mounted for rotation with and is fixed to a centering shaft rotatably supported between opposing walls of the housing. A portion of the centering shaft extends beyond the housing and there is connected to a centering lever. The centering lever is attached to a centering rod, which in turn is attached to the vehicle's pitman arm or tie rod for movement therewith.

The cam follower means includes an elongated rocker member mounted at an intermediate portion for pivotal movement around an off-center bearing fixed to a smaller diameter trimming shaft, which in turn is rotatably supported between opposing walls of the housing. A cam roller is rotatably mounted on one end portion of the rocker member and confronts the cam periphery so as to ride on its outer cam surface. The cam roller is of a size and shape to allow the roller when centered to contact simultaneously opposite sidewalls of a centering depression formed as part of the outer cam surface.

The other end portion of the rocker arm is connected by a pusher member and a spring or rod to a centering piston which is arranged for reciprocal movement within a centering cylinder formed in the housing. During operation, a pressurized fluid is delivered to the centering cylinder and biases the centering piston toward the pusher member. Movement of the centering piston thereby serves to pivot the rocker member about its eccentric bearing. As the rocker member pivots, it causes the cam roller at its opposite end portion to engage the cam surface of the cam member. When the cam member is its center position, which corresponds to the center position of the steering system, the cam roller is pressed into the centering depression so that contact between the cam roller and the sidewalls of the depression generates a resistance force which resists movement of the cam member and of the steering system to which it is connected.

By selectively varying the pressure within the centering cylinder, the pressure and resulting forces between the cam roller and the cam member may be varied, thereby varying the resistance to off-center movement of the steering system. In a preferred embodiment, the centering piston is connected to the rocker member by a compressible spring, and a stop is preferably provided to limit compression of the spring, thereby providing an upper limit to the resistance force that may be generated by contact between the cam roller and the cam member depression.

The turning resistance of the present invention is provided by delivering fluid under pressure to the centering cylinder from a fluid pressure control device which may take a variety of forms and may be either hydraulic or pneumatic. The pressure control device permits the level of resistance to movement away from center to be controllably varied, either by a hand mechanism operable by the driver or by a speed control mechanism responsive to the speed of the vehicle. In a hydraulic embodiment of the invention, the centering cylinder is preferably pressurized by the power steering system of the vehicle. In a pneumatic embodiment, the centering cylinder is preferably pressurized by an air brake system of the vehicle.

It is also within the scope of the present invention to provide hydraulic fluid or air pressurization systems separate from other fluid systems of the vehicle. For example, a pressure accumulator system of the type described in my prior U.S. Pat. No. 4,410,193 may be employed for storing and providing hydraulic fluid under pressure to the centering piston. Regardless of the type of fluid pressurization system employed, the system should generate sufficient pressure to return the cam roller to its center rest position in the centering depression of the cam member upon cessation of intentional steering inputs. The pressurization system should also constantly bias the centering piston assembly into engagement with the rocker member and the cam roller into engagement with the cam surface of the cam member at all time when the compensator is activated so that there is no slack in the compensator linkages at any time during its operation.

Spurious steering inputs tending to move the tie rod in either direction are therefore resisted by a corresponding resistance force generated by interaction between the cam member and the cam roller. Only when intentional steering wheel forces exceed a preselected break away level will the pitman arm of the steering system generate sufficient rotational force on the cam member to rotate it about its rotational axis, thereby causing the centering depression to move relative to the cam roller.

After rotational movement of the cam member is initiated, the steering force required to sustain movement is a function both of the shape of the cam surface along the sides and shoulders of the centering depression and of the shape of the cam periphery beyond the respective shoulders of the centering depression, as well as of other centering phenomena acting on the steering system, such as positive wheel caster. The shape of the centering depression and other compensator parameters may be chosen so that a break away steering force of at least about 20 pounds, preferably at least about 50 pounds, and more preferably at least about 70 pounds must be applied to the tie rod by the pitman arm in order to initiate break away turning movement of the steerable wheels.

If the steerable wheels are provided with positive caster, the sides and shoulders of the depression may be fared into a circular portion of the outer cam surface which is adjacent to the depression and will provide no supplemental cam centering force. In this case, the sides and shoulders of the depression are preferably shaped to provide a decreasing level of cam centering (and resistance) force until the caster centering force, which increases in proportion to turning angle with positive caster, is of sufficient magnitude to alone provide a rapid return of the steering system toward its center position. For example, there may be sufficient positive caster to permit the cam return force to go to zero at turning angles greater than about 20°, preferably greater than about 15°, and more preferably greater than about 10° on either side of center.

However, the cam surface outside of the centering depression may be such that the cam return force does not go to zero, but instead may be effective over the entire range of turning angles, which for highway vehicles is usually limited to about 45° on either side of the centered wheel position (the 0° position).

Another important feature of the present invention is the provision of a remotely operable trimming means for controllably varying the preselected center position of the steerable member to be maintained by the compensator. The actuator for the remotely adjustable trimming means may comprise a reversible electric motor assembly pivotally mounted on the vehicle frame. The electric motor assembly includes drive means for reciprocating a trim rod connecting the motor assembly to a trim lever, which in turn is fixed to a trimming shaft that is fixed to an eccentric bearing of the rocker member of the centering assembly.

Upon selective actuation of the electric motor via an electrical system with a switch means conveniently positioned to the vehicle operator, the trim rod is caused to extend or retract relative to the motor assembly. Movement of the trim rod causes the attached trim lever and trimming shaft to pivot about the axis of the shaft. Because the rocker member of the centering assembly is rotatably mounted on the eccentric bearing and the eccentric bearing is fixed to the trimming shaft in an off-center position relative to its rotational axis, rotation of the latter produces longitudinal movement of the rocker member and alters the position of the cam roller relative to the rotational axis of the centering cam and its shaft. Altering the position of the cam roller causes the rest position of the cam depression and the centering shaft to rotate about the rotational axis of the latter, creating a new center position for both the centering lever and the vehicle steering system connected thereto.

While a reversible electric motor is one preferred means for affecting the trimming operation, it is also within the scope of the present invention to employ any type of remotely controllable linear actuator for the trimming means. For example, hydraulic actuators may be used similar to those disclosed in my prior U.S. Pat. No. 4,410,193. In particular, the trim rod may be connected to a trim piston reciprocally carried within a hydraulic trim cylinder pivotally mounted on the vehicle frame. Hydraulic fluid from a fluid system accumulator or other pressurized fluid source may then be used to create differential pressure in either direction across the trim piston and thereby cause corresponding longitudinal movement of the trim rod. The direction and level of differential pressure may be controlled by inlet and outlet orifices in combination with solenoid stop valves. A liquid trimming fluid is preferred because it is substantially incompressible as compared to a gaseous trimming fluid and therefore provides the capability of locking the trimmed position without appreciable slack.

A driver control panel makes it possible for steering corrections to be made while driving. The panel may be conveniently located near the driver and provides three basic functions, namely, a switch to turn the system on and off, a centering effectiveness control and gauge, and a momentary trim switch. Activating, adjusting and trimming the centering system is therefore an easy and natural driving function. Should the driver sense a degree of steering wheel pull that becomes a bother, it is then quickly eliminated by pressing the trim switch.

The invention provides a distinctive feel when approaching or leaving the center position. Thus, the sense of touch is added to the visual sense to aid control of the vehicle and reduce driver fatigue. A turning resistance of at least about 20 pounds, preferably about 30 to about 150 pounds, should be available at the tie rod for small turning angles away from center, preferably 0°–5°, more preferably 0°–3°, and most preferably within one degree on either side of center. The turning resistance selected should satisfy the road feel desired by the driver and be sufficient to overcome anticipated spurious inputs.

When connected to weak or soft steering systems, i.e. those with no or negative caster, the invention thus provides the driver with a positive touch control not heretofore attainable with those types of systems. Positive stability is thereby achieved for previously unstable steering systems.

Although the present invention is particularly useful as a centering mechanism for large motor vehicles, it can be employed to position any steerable member moveable to either side of a preselected position. For example, the centering compensator can keep an outboard motor centered so that a boat follows a straight course over the water in the presence of spurious steering forces produced by wind and wave action. The compensator can also be used to center such steerable members as the rudders of ships or airplanes and the tongues of tandem trailers or railway cars. The compensator is useable with both power and non-powered steering systems, with the level of compensating forces provided usually being less for vehicles without power steering.

The invention may be used with steering systems having a reduction gear between the steering wheel and the steerable wheels. In this application, the apparatus is preferably connected to the steering system at a location between the steerable wheels and the reduction gear so as to be unaffected by any slack in the reduction gear or in components and connections between the reduction gear and the steering wheel.

The centering compensator is preferably connected between the steering system and a frame member of the vehicle in a position that allows the steerable member to move through its full range of steering movements while providing sufficient leverage for the apparatus to resist movement of the steerable member away from the center position producing straight ahead travel of the vehicle. The steering system connection may be made to any steering system component providing appropriate range and leverage, such as a tie rod which joins the two front steerable wheels of a highway vehicle, or the pitman arm connected to the steering gear. The frame connection may be made to any component serving as a fixed mounting relative to the steering system. This fixed component may be a transverse frame member, or a fixed axle or some other part carried by the vehicle frame instead of an actual frame member.

The apparatus includes control means for remotely and selectively varying both the amount of resistance to movement away from center and the selected center position of the steerable member(s) relative to the vehicle frame. Both of these remote adjustments are preferably made by the driver while the vehicle is in operation. Therefore, electrical control and fluid control systems are employed for remotely operating the centering and trimming units of the centering compensator. The controls for actuating the control systems are preferably located at the driver's station of the vehicle. The electrical controls may comprise one or more switches preferably having a toggle design that is spring-biased to a circuit-open position. Such switches are closed only momentarily when the toggle is held in a depressed position against the spring bias. Thus, the adjusting means, such as a motor or solenoid, is actuated only while the toggle is depressed. Release of the toggle opens the circuit and stops the adjustment at the point selected.

My earlier U.S. Pat. Nos. 4,410,193, 4,418,931, and 4,534,577, the entire contents of which are expressly incorporated herein by reference, solved many of the shortcomings existing in the prior art. The present invention provides improvements over these earlier patents, especially in the areas of simplicity, precision, and reliability.

BRIEF DESCRIPTION OF THE DRAWINGS

The invention, both as to its structure and operation, may be further understood by reference to the detailed description below taken in conjunction with the accompanying drawings in which.

DETAILED DESCRIPTION OF THE INVENTION

Figures 1, 2:
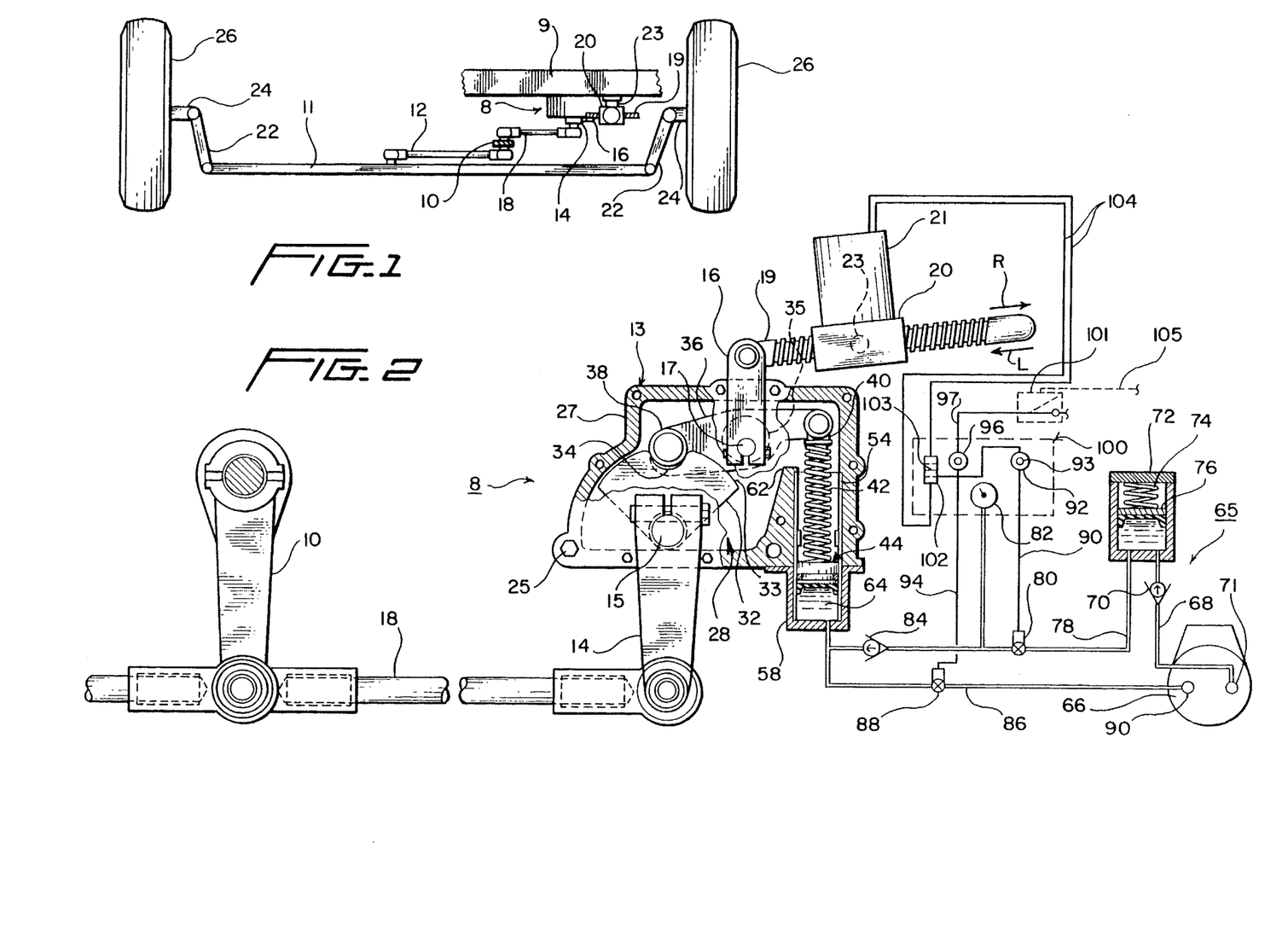
FIG. 1 is a plan view illustrating installation of the invention between the frame and steering system of a motor vehicle.
FIG. 2 is a schematic diagram of the fluid and electrical systems and of the major components of the invention, and includes partial sections showing structural details of the centering unit and its pressure accumulator.

The detent centering compensator of the present invention comprises a centering unit, generally designated 8, which may be connected between the frame 9 and the pitman arm 10 of a conventional motor vehicle as shown in FIG. 1 of the drawings. Intentional steering inputs by the driver are transmitted from the pitman arm 10 to a tie rod 11 through a steering rod 12. The steering rod 12 and the other steering system components connected thereto are conventional and include bell cranks 22, 22 carried by knuckles 24, 24, which support front steerable wheels 26, 26 for pivotal turning movement about respective king pins (not shown) mounted on the vehicle frame 9.

The compensator includes a housing 13 having a centering lever 14 extending transversely from a rotatably mounted cam shaft 15 and a trimming lever 16 extending transversely from a rotatably mounted trim shaft 17. The projecting end of the centering lever 14 is connected to the pitman arm 10 by means of a connecting rod 18, while the projecting end of the trimming lever 16 is connected to a trimming rod 19 associated with a trim control mechanism having a pivotally mounted gear box 20 and a reversible electric motor 21. Gear box 20 and motor 21 are mounted on frame 9 by a pivot connection 23 to permit pivotal movement of rod 19 in the pivot plane of trimming lever 16.

As shown in FIG. 2, compensator housing 13 is bolted to the vehicle frame 9 by bolts 25 and includes an outer wall 27 enclosing and defining an interior chamber 28 which contains a generally pie-shaped centering cam 32 fixed to centering shaft 15. Centering cam 32 includes an outer peripheral cam surface 33 having a centering depression 34 of a particular cross-sectional configuration as described below. Centering shaft 15 is rotatably mounted in housing wall 27 by conventional bearing assemblies, which are not shown for purposes of simplicity.

Interior chamber 28 further contains a cam follower assembly comprising a rocker member 36 pivotally carried by an off-center bearing 35 fixed to trimming shaft 17, which is also rotatably mounted in housing wall 27 by conventional bearing assemblies that are not shown for purposes of simplicity. At its distal end, rocker member 36 carries a cam roller 38, and at its proximate end a pivotally mounted pusher member 40 engaged by a spring 42. Cam roller 38 is rotatably mounted on rocker member 36 and preferably has a substantially cylindrically-shaped outer surface capable of providing line contact with at least some portions of the cam surface 33, such as the sidewalls of the centering depression 34 as shown in FIGS. 5A–5D.

Figure 3:
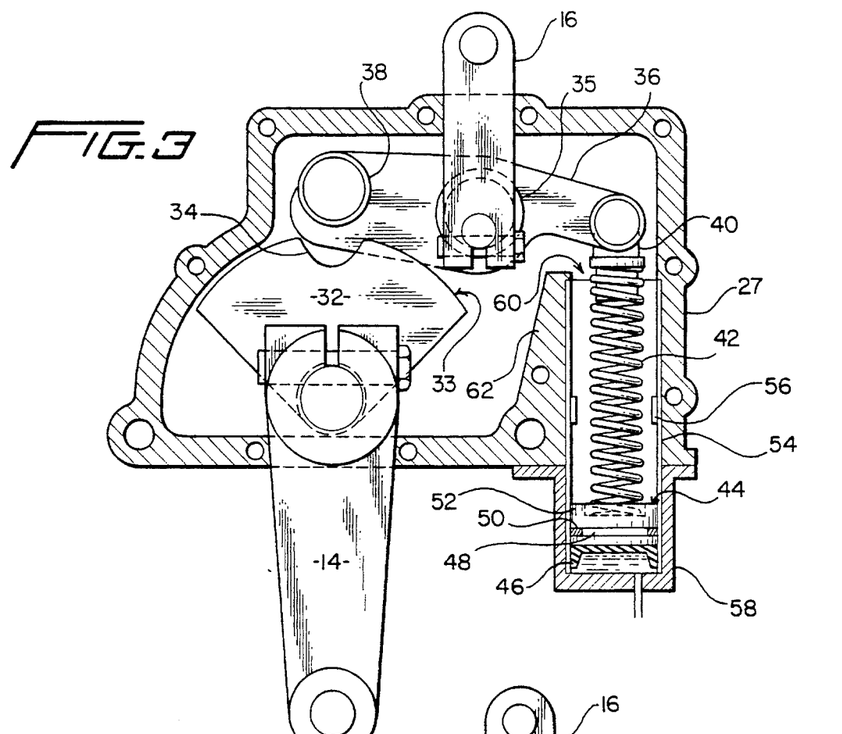
FIG. 3 is a partial sectional view in elevation showing the centering unit when deactivated.
Figure 4:
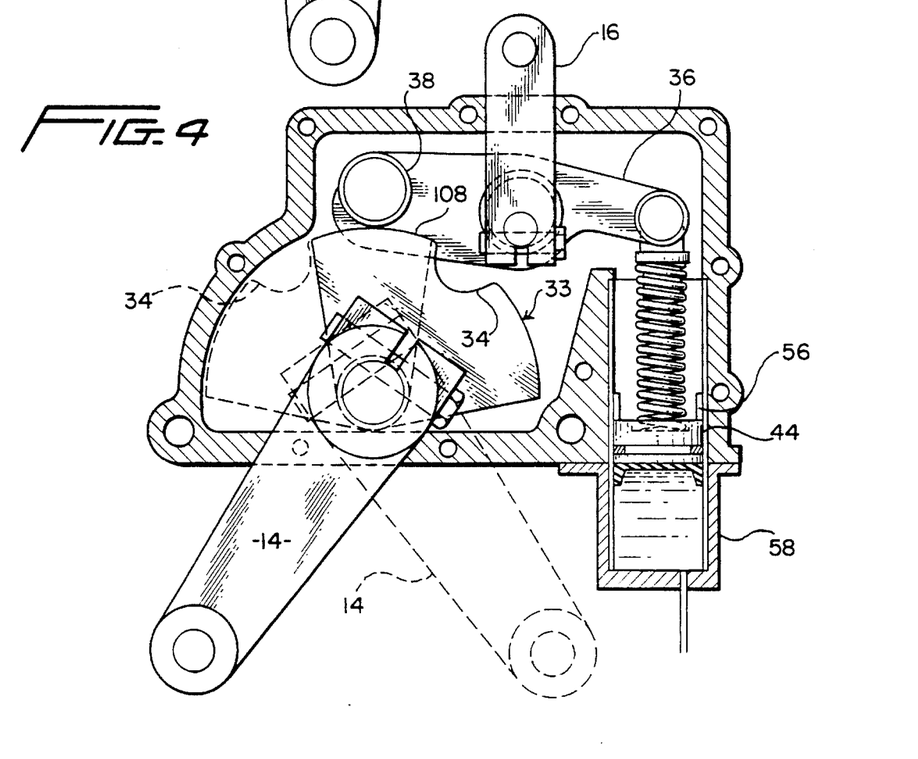
FIG. 4 is a partial sectional view in elevation showing the centering unit activated but with the centering lever moved off-center.

As may be seen best in FIGS. 3 and 4, spring 42 is arranged to be compressed by a piston 44 having an elastomeric cup 46, a groove 48 for receiving an O-ring seal 50, and a sleeve 52 for receiving the end of spring 42 opposite from pusher member 40. Piston 44 reciprocates in a cylinder shell 54 between an annular stop 56 and the lower portion of shell 54 which is closed by a housing extension 58. The upper portion of shell 54 is press fitted into a cylindrical sub-chamber 60 defined by outer housing wall 27 and an interior housing wall 62.

The lower portion of cylinder shell 54 between piston cup 46 and the lower end of housing extension 58 defines a reservoir chamber 64 for receiving hydraulic fluid from a hydraulic system 65, which is preferably pressurized by a conventional power steering pump 66. The hydraulic system comprises a supply line 68 containing a supply check valve 70 and connecting a high pressure outlet 71 of pump 66 to the inlet of a pressure accumulator 72 having a spring 74 for storing dynamic energy when compressed by a piston 76. Since power steering pumps only operate when the steerable wheels are turned by the steering wheel, accumulator 72 must store the dynamic energy it receives from the pressurized fluid that may pass from pump outlet 71 through check valve 70 only during intermittent pump operation. An inlet supply line 78 contains a solenoid actuated stop valve 80, a pressure gauge 82 and an inlet check valve 84, and connects the outlet of accumulator 72 with reservoir 64. A return line 86 contains a solenoid actuated stop valve 88 and connects reservoir 64 to a low pressure inlet 90 of pump 66.

It is to be understood that the hydraulic system components described herein are connected together by appropriately sized fluid conduits and that these conduits are represented by the lines interconnecting these components as shown in FIG. 2. It is also contemplated that pump 66 may be a specialty pump which is independent of a vehicle's power steering system and could be electrically operated or operated with a belt driven by the vehicle engine. However, it is preferable to use the power steering pump when available because the centering compensator is automatically deactivated when the vehicle engine is cut off or when either the engine or the pump fails. If a separate specialty pump is used, these cut off features may be provided by a correspondingly actuated switch for deactivating the system as described below in connection with the embodiment of FIG. 7.

The solenoid of stop valve 80 is electrically connected by a line 90 to a pressurizing switch 92, which preferably has a spring biased button 93 that must be pushed and held in to briefly open the valve and thereby pressurize reservoir 64 to a selected fluid pressure between ambient and that of accumulator 72 as indicated by gauge 82. The solenoid of stop valve 88 is electrically connected by a line 94 to an on/off switch 96, which in turn is connected to a source of electrical power by a line 97. The off position of switch 96 opens valve 88 and thereby depressurizes reservoir 64 as shown in FIG. 3 by causing the fluid therein to be returned to the low pressure inlet 90 of pump 66. Switches 92 and 96, along with pressure gauge 82, are mounted on a control panel 100, which is preferably located at or near the driver's station within the vehicle in a position easily reached by the driver during operation of the vehicle.

FIG. 3 shows the position of the rocker member 36 and related components when the centering system is deactivated by turning off switch 96, thereby opening valve 88 and depressurizing reservoir 64. In order to move centering piston 44 toward pusher member 40 and thereby compress spring 42, switch 96 is turned on to close valve 88 and hydraulic fluid is selectively introduced into reservoir 64 by briefly actuating pressurizing switch 92 to open valve 80 until the desired pressure is registered on gauge 82. The maximum compression of spring 42, and thereby the maximum centering force, is achieved when piston 44 is forced into engagement with stop 56.

As spring 42 is compressed, it acts through pusher member 40 to pivot rocker member 36 about eccentric bearing 35 in a counter-clockwise direction with respect to the orientation of FIGS. 2–3. This pivoting movement of rocker member 36 serves to press cam roller 38 at its distal end toward and into the aligned depression 34. Cam roller 38 then continues toward the bottom of depression 34 until it comes to rest against opposite sidewalls thereof as seen best in FIG. 5. In this seated position, there is preferably line contact between roller 38 and each of the opposing sidewalls 106, 106 of depression 34 as shown in FIGS. 5A–5D. Such line contact provides zero slack centering of the steering system. Line contact forces between roller 38 and depression 34 are therefore generated by the compression of spring 42, and these forces effectively prevent rotation of cam 32 and a corresponding pivoting of centering lever 14 in either direction until a steering force on lever 14 is of sufficient magnitude to rotate cam 32 and thereby initiate relative movement between roller 38 and the portion of cam surface 33 forming depression 34.

By selectively varying the pressure within reservoir 64, the line contact forces between cam roller 38 and sidewalls 106, 106 of centering depression 34 may be varied, thereby varying the resistance to off-center movement of the vehicle steering system. However, the maximum contact force, and therefore the maximum steering input required to initiate relative motion between roller 38 and depression 34, is limited by the annular stop 56, which is positioned along the axis of shell 54 to limit the compressive movement of piston 44 and thereby limit the compression of spring 42.

Thus, even though contact between roller 38 and depression 34 prevents rotation of cam 32 in response to spurious steering inputs, an intentional steering input force above a predetermined or "break away" level will initiate rotation of cam 32. In particular, a sufficiently strong steering force transmitted through pitman arm 10, connecting rod 18, centering lever 14 and centering shaft 15 to cam 32 will initiate rotation of cam 32 in spite of the resistance provided by the interaction between cam roller 38 and depression 34. By way of example, the shape of centering depression 34 and other compensator parameters may be chosen so that a total break away steering force of at least twenty pounds, preferably at least fifty pounds, and more preferably at least seventy pounds must be applied to the tie rod 11 by the compensator connecting rod 18 to initiate turning movement of wheels 26, 26.

Pivotal rotation of cam 32 causes cam roller 38 to ride up one of the inclined sidewalls 106, 106 of depression 34 and over a corresponding one of its shoulders 107, 107 until the roller leaves the depression and rides on the outermost peripheral extension 108 of cam surface 33 as shown in FIG. 4. While roller 38 is being forced to ride up a sidewall of depression 34, the force transmitted from spring 42 through rocker member 36 provides a centering force seeking to return roller 38 to its seated or "centered" position in which it simultaneously contacts both sidewalls of the centering depression. As a result, while roller 38 travels along one or the other sidewalls and shoulders of depression 34, a continuous centering force acts through the cam 32 and its connections to tie rod 11 to bias the vehicle's steerable wheels 26, 26 toward their preselected center positions.

Figures 5A, 6:
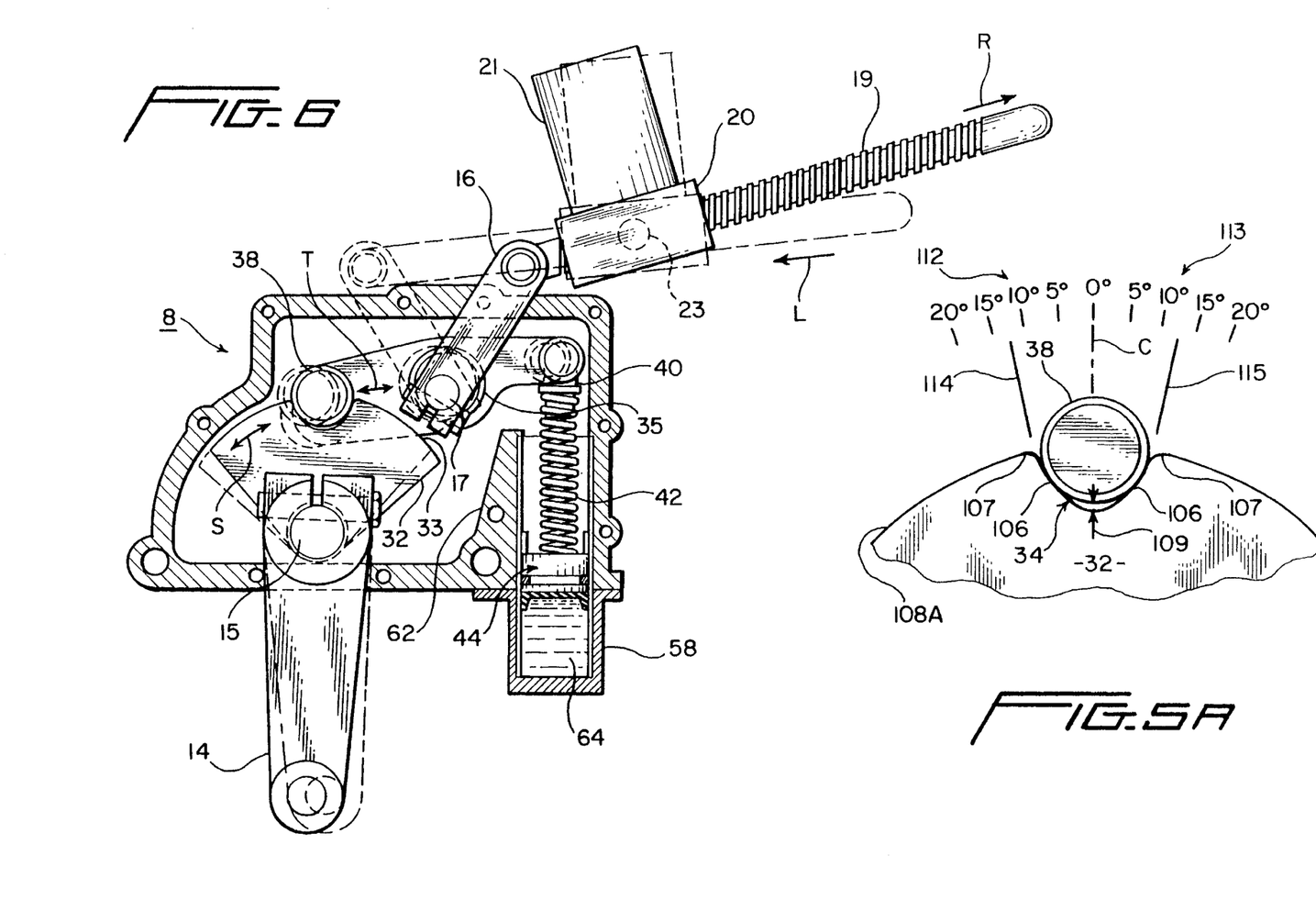
FIGS. 5A, 5B, 5C and 5D are fragmentary views showing details and alternative shapes of the cam surface and its engagement by the follower roller.
FIG. 6 is a partial sectional view in elevation showing the trimming mechanism with the trimming lever moved to change the center position to be maintained by the centering unit; and, FIG. 7 is a schematic diagram of the fluid and electrical systems and of the major components of a modification of the invention, and includes partial sections showing structural details of the centering unit.

The centering depression 34 is preferably shaped or "cut" so as to provide a supplemental centering force which blends with the return force provided by the usual steering geometry of the front end of a roadway vehicle, which may or may not include a power steering unit. Therefore, once cam 32 pivots through a sufficient angle for roller 38 to pass over shoulders 107, 107 of depression 34 and completely leave the depression, the centering force generated by spring 42 decreases and the magnitude of this force depends on the shape or "cut" of the outermost extensions 108, 108 of cam surface 33. If the cut of cam surface extensions 108, 108 is substantially circular about the rotational axis of centering shaft 15 as shown in FIG. 5A, roller 38 will be equally susceptible to movement in either direction relative to cam 32 when out of the depression 34. However, a circular cut of the outermost cam surface extensions may only be appropriate for vehicle steering systems designed to provide strong geometric centering forces, such as those with strong positive caster. In the latter case, the only force seeking to return cam 32 to its original position at turning angles greater than about 10° would be the positive caster acting directly on steerable wheels 26, 26.

Geometric centering forces usually decrease to zero before a vehicle steering system returns to its center position. As illustrated by the indicia of scales 112 and 113 in FIGS. 5A–5D, which indicate in degrees the amount that the steerable wheels 26, 26 have been turned to the left and right, respectively, the interaction between the centering depression 34 and roller 38 substantially increases the centering force available at and immediately adjacent to either side of the straight ahead position of the steerable wheels 26, 26. In the example shown, geometric centering forces have decreased to substantially zero at about 13° on either side of the center position "C" as indicated by a left turn position line 114 and a right turn position line 115. At greater turning angle positions, the centering force provided by cam 32 may taper off as a positive geometric centering force increases as described in more detail in my prior U.S. Pat. No. 4,418,931, the entire contents of which are expressly incorporated herein by reference.

Figure 5B:
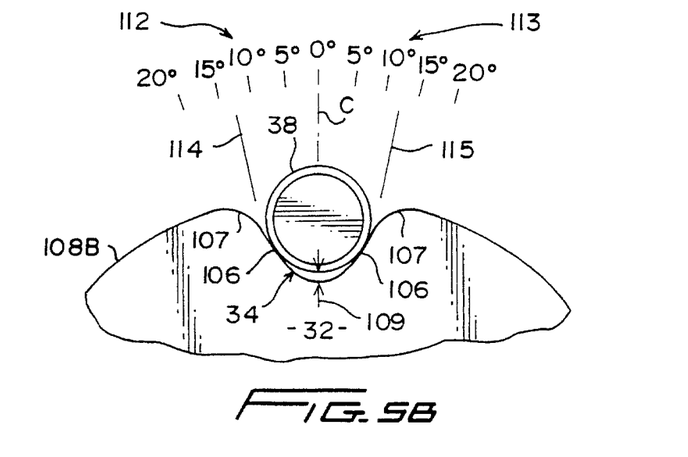
Figure 5C:
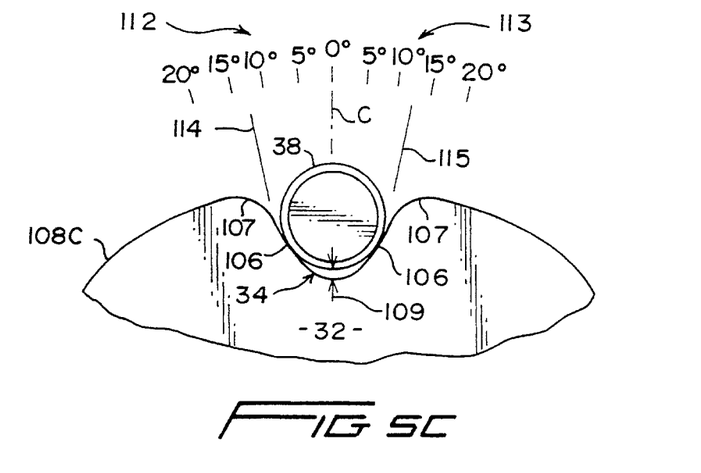
Figure 5D:
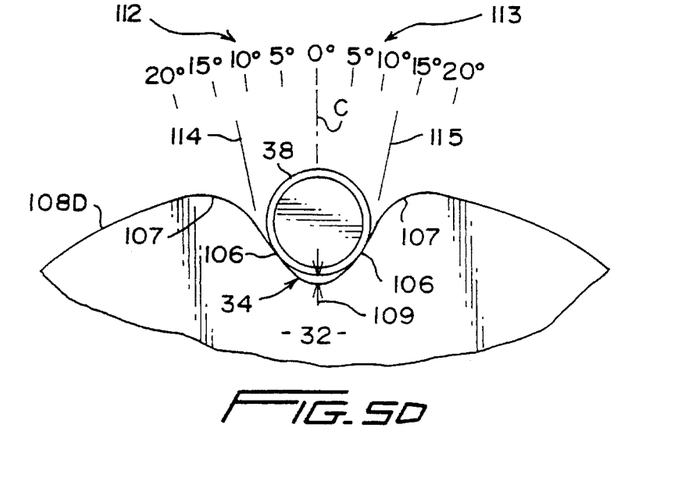

If, for example, steerable wheels 26, 26 are provided with strong positive caster, the sides and shoulders of centering depression 34 may be fared into circular cam surface extensions, such as represented by lines 108A, 108B and 108C in FIGS. 5A, 5B and 5C. The cam depression 34 may then have a shape that provides a decreasing level of cam centering force until the caster centering force, which increases in proportion to turning angle with positive caster, is of sufficient magnitude to alone provide a rapid return of the steering system toward the center position.

Alternative cam surface extensions 108A, 108B and 108C illustrate that the radial extent and shape of depression sidewalls 106, 106, as well as the shape and intermediate peripheral extent of depression shoulders 107, 107, will vary, depending on where the geometric centering force goes to zero and on other inherent steering system characteristics. In this regard, there preferably is sufficient geometric centering force for the cam centering force provided by centering depression 34 to be effective over the range 0°–20°, more preferably 0°–15°, and most preferably 0°–10° on either side of center C (the 0° position). However, such geometric centering forces are usually not available in the steering systems of large trucks, buses and motor homes.

By appropriately contouring the peripheral cam surface portions on either side of centering depression 34, the cam centering force generated by cam roller 38 need not go to zero, but instead may be effective over the entire range of turning angles, which for road vehicles is usually limited to about 45 degrees on either side of the center position C, i.e., the zero degree (0°) position, of the steering system. Such a contour is illustrated by alternative cam surface extensions 108D in FIG. 5D. These peripheral portions are not fared into a circular periphery and therefore provide a cam centering force over the entire range of turning angles. Extensions 108D also illustrate a steering system wherein the geometric centering force goes to zero at about 20° on either side of center C.

As also shown in FIGS. 5A–5D, a gap 109 is preferably provided between the fully seated roller 38 and the bottom of depression 34 to ensure that line contact is provided between roller 38 and the sides of depression 34. Gap 109 also ensures that if true line contact is lost due to wearing of the depression sidewalls, the seated roller is kept out of contact with the bottom of the depression and therefore will continue to provide zero-slack centering of the steering system.

Movement of cam 32 to either side of center in response to intentional turning movements is illustrated in FIG. 4. When an intentional turning movement transmitted through pitman arm 10 has ceased to act on steering rod 12, tie rod 11 and steerable wheels 26, 26, a positive caster of wheels 26, 26 (or other positive centering geometry) will automatically seek to return these wheels and the steering system toward their original, center tracking positions. This initial travel toward the center position C would be assisted by peripheral cam surface extension such as 108D in FIG. 5D. Because any return movement of wheels 26, 26 is transmitted to cam 32 via connecting rod 18 and centering lever 14, return movements of wheels 26, 26 cause cam 32 to rotate toward an orientation wherein a shoulder 107 of depression 34 will intersect the peripheral path of travel of cam roller 38 along cam surface 33.

As soon as a shoulder 107 of centering depression 34 intersects roller 38, compressed spring 42 begins (or continues) to rotate rocker member 36 counter-clockwise to press roller 38 into depression 34 in the same manner as when the system is activated as discussed above with reference to FIG. 3. Thus, when roller 38 re-enters centering depression 34, the centering force generated by spring 42 becomes effective again (or becomes more effective upon leaving a cam surface portion like 108C). This force quickly re-establishes the position wherein roller 38 contacts the opposite sidewalls 106, 106 of depression 34, this position corresponding to the straight ahead or "centered" orientation of wheels 26, 26.

Any additional rotation of cam 32 beyond the 0° position of alignment between the seated cam roller 38 and the centering depression 34 is resisted by interaction of the roller with the opposite wall of depression 34. Thus, the cam and follower arrangement of the present invention significantly reduces the chance of over shooting the center position, and thereby over-steering the vehicle, by providing an increasing resistance to movement in either direction away from the center position corresponding to straight ahead movement of the wheels 26, 26.

An important feature of the present invention is that it may use fluid pressure provided by the power steering pump of a conventional power steering system. In this application of the invention, there is therefore no need to provide special hardware for deactivating the centering system as it is automatically turned off by a failure of the power steering pump or a leak in the power steering system. However, it is also within the scope of the invention to employ a special fluid pump separate from the power steering system and to provide an optional deactivation control 101 (FIG. 2) for turning off the centering system automatically in response to a power steering sensor (not shown) connected to control 101 by a line 105. The power steering sensor is capable of sensing inoperative conditions, such as a loss of pressure or a failure of the pump, in the separate power steering system.

Another important feature of the present invention is the provision of a remotely operable trimming means for controllably varying a selectable center position of the steerable wheels as achieved by the interaction of cam roller 38 with cam 32. The actuator for the remotely adjustable trimming means comprises the reversible electric motor assembly 21 pivotally supported by the vehicle frame 9. The gear box 20 serves as a drive means for reciprocating the trimming rod 19 and the trim lever 16 as shown in FIG. 6.

Referring now to FIG. 2, a conventional three position toggle trim switch 102 is mounted on control panel 100 and connected to trimming motor 21 by electrical power lines 104, 104. Switch 102 preferably has a toggle 103 which is spring biased into a center normally off position from an up position for driving trimming rod 19 to the right in the direction of arrow R, and a down position for driving trimming rod 19 to the left in the direction of arrow L.

Therefore, upon selective actuation of switch 102 from its off position to its up position, reversible electric motor 21 is activated to drive trimming rod 19 in a retraction direction with respect to gear box 20 as indicated by arrow R. Similarly, upon selective actuation of switch 102 from its off position to its down position, reversible electric motor 21 is activated to drive trimming rod 19 in an extension direction, opposite to the retraction direction, with respect to gear box 20 as indicated by arrow L. Gear box 20 may employ a conventional worm screw gear train or the like (not shown), which is rotated by motor 21 for extending and retracting trimming rod 19.

The linear movement of trimming rod 19 in the respective directions indicated by arrows R and L causes attached lever 16, attached shaft 17 and attached eccentric bearing 35 to rotate in a clockwise and a counter-clockwise direction, respectively, relative to the rotational axis of shaft 17 as viewed in FIG. 6. Because bearing 35, on which rocker member 36 is pivotally mounted, is fixed eccentrically to shaft 17, rotation of shaft 17 causes a corresponding transverse alteration of the pivot axis of rocker member 36, which in turn moves roller 38 linearly in corresponding directions, which are represented by the double-ended arrow T and are generally parallel to retraction direction R and extension direction L.

In this manner, clockwise and counter-clockwise rotations of shaft 17 and the fixedly attached eccentric bearing 35 cause cam roller 38 to shift the center position C of cam depression 34 in corresponding rotational directions relative to the rotational axis of centering shaft 15, as represented by the double-ended arrow S in FIG. 6. In other words, as a result of linear displacement of cam roller 38 relative to the rotational axis of trimming shaft 17, a new rest position of cam roller 38 is achieved because of its corresponding lateral movement relative to the rotational axis of cam 32 and centering shaft 15. By so altering the rest position of cam roller 38, cam depression 34 when engaged by roller 38 is forced to rotate about its rotational axis, thereby creating a new center position for both cam 32 and the steerable members 26, 26 connected thereto.

With the centering unit 8 mounted on the rear side of frame member 9 as shown in FIG. 1, the front wheels 26, 26 are trimmed toward the right side of the vehicle by temporarily holding the trimming switch 102 in its up position and thereby causing clockwise rotation of trimming lever 16. The front wheels 26, 26 are trimmed toward the left side of the vehicle by temporarily holding switch 102 in its down position and thereby causing counter-clockwise rotation of trimming lever 16. When the desired course correction is achieved by such actuation of switch 102, the switch toggle 103 is released and moves to its center off position in response to its spring bias.

While the embodiment of FIGS. 1–6 employs a coiled spring 42 to apply a resilient force to the proximate end of rocker member 36, the present invention is not to be limited to the coil spring arrangement shown in these drawings. Rather, the present invention is directed to any arrangement by which a resilient means applies a resilient force to the proximate end of rocker member 36. For example, in the alternative centering unit 110 of FIG. 7, pressurized air is trapped in an air chamber 120 to provide an "air spring" which functions as a resilient means for providing a resilient centering force that increases with downward compressive movement of an air piston 122. For purposes of simplicity, components employed in the embodiment of FIG. 7 that are similar to the components shown in other figures have been given the same numeral designation.

Figure 7:
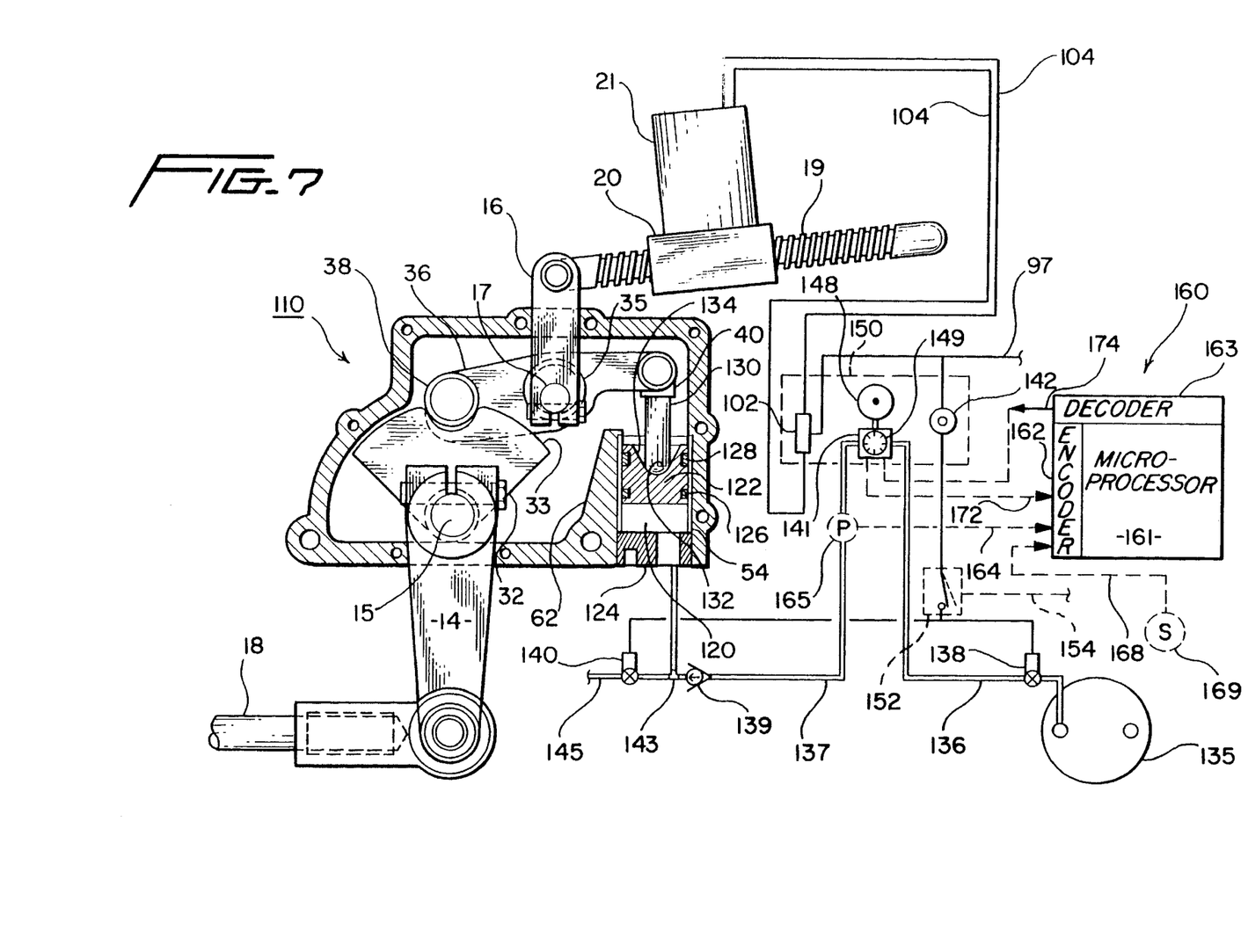

As shown in FIG. 7, the cylinder shell 54 is closed by a threaded cap 124, and the air piston 122 includes a groove mounted O-ring seal 126 and a groove mounted wear ring 128. The push member 40 pivotally mounted on rocker member 36 is connected to a push rod 130 having a free (unsecured) and rounded lower end portion 132 for engaging a conically-shaped upper end surface 134 of centering piston 122. All other components connected to rocker member 36 are the same as previously described in connection with the embodiment of FIGS. 1–6.

Air chamber 120 is connected to a supply of pressurized air, such as air tank 135 of a vehicle airbrake system, by air lines 136 and 137. Air line 136 contains a solenoid operated supply valve 138 and connects tank 135 to the inlet of a pressure regulator 141. Air line 137 contains a check valve 139 and connects the outlet of pressure regulator 141 to air chamber 120. A vent line 145 is connected to a T-connector 143 in line 137 and contains a solenoid operated vent valve 140. Supply valve 138 is opened and vent valve 140 is closed by turning on a system on-off switch 142 connected to electrical power line 97 and located on a control panel 150 at the driver's station within the vehicle. The pressure maintained in chamber 120 is indicated by a gauge 148 connected to an outlet passage of regulator 141.

When switch 142 is in its off-position, supply valve 138 is closed and vent valve 140 is open such that air chamber 120 is vented to atmospheric pressure. When chamber 120 is vented, air piston 122 rests against cylinder cap 124 and roller 38 is disengaged from depression 34, similar to the deactivated position of rocker member 36 as shown in the embodiment of FIG. 3. In order to move air piston 122 upward through cylinder 54, switch 142 is moved to its on-position, thereby closing vent valve 140 and opening supply valve 138 to pressurize air chamber 120 to the outlet air pressure set by the pressure regulator 141. This outlet pressure may be adjusted manually by a knob 149 on the face of control panel 150, or may be controlled by an on-board computer 160 as described below.

As air piston 122 moves upward through cylinder 54 in response to air pressure in chamber 120, rounded end portion 132 of push rod 130 slides within conical surface 134 until it becomes fully seated in the apex formed by the central portion of this conical surface. Further upward movement of air piston 122 serves to upwardly displace push rod 130, causing attached rocker arm 36 to pivot about eccentric bearing 35 in the counter-clockwise direction. Such pivotal movement of rocker member 36 displaces cam roller 38 toward cam 32 and causes it to enter centering depression 34 when wheels 26, 26 are in or turned into their centered position.

As soon as cam roller 38 contacts the opposite sidewalls 106, 106 of centering depression 34, the air piston 122 functions to press the cam roller into line contact with the centering depression with a resilient centering force that seeks to restrain cam 32 from rotating in either direction as previously described. By selectively varying the pressure within air chamber 120 by adjusting the setting of air pressure regulator 141, the centering force between roller 38 and the sidewalls 106, 106 of depression 34 may be varied, thereby varying the resistance to off-center movement of the steerable wheels 26, 26.

As an alternative to manual adjustment, the output pressure of air pressure regulator 141 may be adjusted by a reversible electric motor (not shown) controlled by the on-board computer 160, which comprises a microprocessor 161, an encoder 162 and a decoder 163. Encoder 162 converts to digital signals an analog signal 164 input from a pressure sensor 165 in air supply line 137, an analog signed 168 input from a vehicle speed sensor 169, and an analog signal 172 input from a position sensor (not shown) within regulator 141. Decoder 163 converts digital control signals generated by microprocessor 161 to an analog signal 174 for controlling the reversible electric motor which adjusts the output pressure provided by regulator 141. The air pressure in chamber 120 and the resulting resistance and centering forces are thereby made automatically responsive to the speed of the vehicle to provide "speed sensitive centering" of the vehicle's steering system. For reasons already explained above, it is preferable that the resistance to turning movements away from the center position C be increased automatically as the speed of the vehicle increases.

The particularly important trimming feature of the invention may be achieved through drive means other than the gear box 20 driven by the reversible electric motor 21. For example, movement of the trimming lever 16 may be accomplished by controllably varying its position with a piston carried by a hydraulic cylinder pivotally mounted to the vehicle frame 9 in place of gear box 22. One such hydraulic trimming piston and cylinder arrangement is described in the my prior U.S. Pat. No. 4,418,931, which is incorporated herein by reference. However, the reversible electric motor arrangement shown in the drawings is preferred for its simplicity in avoiding the need for a more complicated hydraulic system.

As it is best to deactivate compensator 110 in the event of a failure of the power steering system, a switch 152 for interrupting electrical power to solenoid valves 138 and 140 may be provided for vehicles with power steering systems. Switch 152 is connected by a line 154 to a pressure sensor (not shown) located in a hydraulic line in fluid communication with the outlet of the power steering pump. A loss of pressure at the pump outlet causes switch 152 to open, thereby causing supply valve 138 to close and vent valve 140 to open for depressurizing chamber 120. Vent line 145 and vent valve 140 are preferably of larger capacity than supply lines 136 and 137 to ensure that air chamber 120 will be depressurized even if supply valve 138 fails to close with the opening of pressure switch 152.

It is also important to recognize that the centering compensators of the present invention engage the vehicle steering system at a location between the steerable wheels and the steering gear assembly from which extends the pitman arm 10. As a result, spurious inputs from the steering column and/or from a power steering unit are absorb by the compensator before these inputs can reach the steerable wheels. Likewise, spurious forces transmitted from the roadway are immediately absorbed in the compensator, rather than being transmitted through the entire steering assembly before encountering any stabilizing resistance from the steering wheel. As a result, the centering compensator protects the interior components of the steering assembly from the wear caused by repeated oscillations between states of tension and compression.

By varying the contact pressure between roller 38 and cam 32 through control of fluid pressure in either liquid reservoir 64 or air chamber 120, the break away resistance and the centering return force produced by the invention can be increased or decreased as desired. Manual pressure control in either of the embodiments may be provided by a hand held switch biased to the off position, such as switch 92, or by a manually adjustable fluid pressure regulator, such as regulator 141. The range of pressures available should be selected so that break away resistance can be varied from relatively low at low speeds to relatively high at high speeds. In either embodiment, the fluid pressure also may be controlled automatically in response to vehicle speed, such as by using computer 160 to control a reversible electric motor for operating a pressure regulator in direct response to vehicle speed.

Both embodiments of the invention also may be used with other tie rod arrangements and with steering systems that do not require tie rod arrangements, such as those with only one steerable member, such as the rudder of a ship or an airplane. Without the centering compensator of the present invention, spurious steering forces of relatively small magnitude can cause the steering systems of all human occupied vehicles to move to one side or the other of center or to oscillate back and forth, thereby producing corresponding movements of the vehicle away from the desired direction of vehicular travel. In the operation of roadway motor vehicles, such spurious inputs may be caused by road forces acting on the vehicle wheels, environmental forces acting on the vehicle body, driver forces acting on the steering wheel, off-center bias inherent in the steering system itself, or any combination of one or more of these forces.

The centering components can be used alone as a centering mechanism without the remote trimming feature. On the other hand, the remote trimming features of the present invention are useable not only with the compensators disclosed herein, but also in combination with centering mechanisms of the prior art. Thus, the remotely operable trimming components of the present invention can be combined with centering devices of known types to provide adjustment of the center position during vehicle operation. In addition, a number of other modifications to both the centering components and the trimming components specifically described herein are possible without departing from the scope of the invention, as defined by the claims below.

What is claimed is:

1. A compensating apparatus for providing a resistance force resisting steering forces tending to move at least one steerable member to either side of a selected position, said apparatus comprising:

cam means including a cam member connected to said steerable member for movement therewith, said cam member having a cam surface formed on at least a portion thereof, and said cam surface including a centering depression;

cam follower means including a follower member arranged to contact said cam surface and to be received in said centering depression and having a seated position for simultaneously contacting opposite sides of said centering depression, and an elongated rocker member pivotally mounted at an intermediate portion thereof between respective end portions thereof, one of said end portions comprising means for mounting said follower member; and, actuating means for engaging the other end portion of said rocker member to press said follower member into contact with said cam surface and into said seated position when received in said centering depression, said actuating means comprising resilient means, means for pressing said resilient means, and means for applying a resilient force against the other end portion of said rocker member in response to the pressing of said resilient means;

wherein said resilient force causes said cam follower to provide said resistance force at least when said cam follower is received in said centering depression;

wherein said resilient means comprises a spring member;

and wherein said pressing means comprises a piston arranged for reciprocating movement in a cylinder in response to a spring force applied to one side of said piston by said spring member and to a pressure applied to another side of said piston by a pressurized fluid, and a fluid system for supplying said pressurized fluid to said cylinder on said another side of said piston.

2. An apparatus according to claim 1, wherein said actuating means further comprises limiting means for limiting the amount by which said resilient means may be pressed by said pressing means, said limiting means comprising a stop arranged to limit a distance said piston can travel within said cylinder toward said one side of said piston.

3. An apparatus according to claim 1, wherein said at least one steerable member is a steerable wheel of a motor vehicle having a hydraulic power steering system, and wherein said fluid system comprises an hydraulic system in fluid communication with said power steering system.

4. An apparatus according to claim 1, wherein said at least one steerable member is a steerable wheel of a motor vehicle having an air brake system, and wherein said fluid system comprises a pneumatic system in fluid communication with said air brake system.

5. An apparatus according to claim 1, wherein said cam member is mounted for rotation on a centering shaft connected to said steerable member; wherein said rocker member is supported for rotation around an eccentric bearing means fixed eccentrically on a rotatably mounted trimming shaft such that rotation of said trimming shaft around a rotational axis causes said eccentric bearing means to linearly alter the seated position of said cam follower member relative to said rotational axis of said trimming shaft; and wherein said apparatus further comprises trimming means comprising drive means for selectively rotating said trimming shaft and said eccentric bearing means to linearly alter the seated position of said cam follower member, and actuator means for operating said drive means from a location remote from said drive means and said steerable member, said alteration controllably varying a center position of said cam member and said selected position of said at least one steerable member.

6. An apparatus according to claim 5, wherein said trimming means further comprises reversible motor means, a trimming rod selectively movable in an extension direction and a retraction direction by said motor means, and switch means connected to said motor means so that actuation of said switch means causes said motor means to selectively move said trimming rod; and wherein said trimming rod is connected to said trimming shaft so that said movement of said trimming rod causes said trimming shaft and said eccentric bearing to rotate and thereby linearly alter the seated position of said cam follower member relative to the rotational axis of said trimming shaft.

7. An apparatus according to claim 1 for use on a vehicle having a steering system comprising said at least one steerable member, said apparatus further comprising trim means for changing a center position of said cam member so as to selectively vary said selected position of said steerable member while said vehicle is in operation, said trim means comprising drive means for causing trimming movement of said cam member in response to at least one remote input so as to change the center position of said cam member while said follower member is in said seated position in said centering depression, and control means for selectively providing said at least one remote input to said drive means from a location remote to said cam member.

8. An apparatus according to claim 1, wherein said at least one steerable member is a steerable wheel of a motor vehicle, and wherein said apparatus further comprises activating means for causing said cam follower member to engage said cam surface at selected times during operation of said vehicle.

9. An apparatus according to claim 1 further comprising control means for changing the amount of said resilient force from a location remote from said actuating means by varying an amount by which said resilient means is pressed by said pressing means, said changes in the resilient force causing corresponding variations in said resistance force.

10. An apparatus according to claim 9, wherein said control means comprises means for manually adjusting the amount by which said resilient means is pressed by said pressing means.

11. An apparatus according to claim 9, wherein said control means comprises means responsive to a sensed condition for automatically adjusting the amount by which said resilient means is pressed by said pressing means.

12. An apparatus according to claim 9 for use on a vehicle having a steering system comprising said at least one steerable member, wherein said control means comprises means responsive to a speed of said vehicle for automatically adjusting the amount by which said resilient means is pressed by said pressing means.

13. An apparatus according to claim 1, wherein said cam surface has opposite extensions each of which extends from a corresponding side of said centering depression and the shape of which is such that when it is in contact with said follower member said cam member and said follower member, are biased relative to each other by a return force tending to return said follower member to said seated position in said centering depression.

14. An apparatus according to claim 13 for use on a vehicle having a steering system comprising said at least one steerable member, wherein said extensions encompass a full range of movement of said steerable member to either side of said selected position.

15. A compensating apparatus for providing a resistance force resisting steering forces tending to move at least one steerable wheel of a motor vehicle to either side of a selected position, said apparatus comprising:

cam means including a cam member connected to said steerable wheel for movement therewith, said cam member having a cam surface formed on at least a portion thereof, and said cam surface including a centering depression;

cam follower means including a follower member arranged to contact said cam surface and to be received in said centering depression and having a seated position for simultaneously contacting opposite sides of said centering depression, and an elongated rocker member pivotally mounted at an intermediate portion thereof between respective end portions thereof, one of said end portions comprising means for mounting said follower member; and, actuating means for engaging the other end portion of said rocker member to press said follower member into contact with said cam surface and into said seated position when received in said centering depression, said actuating means comprising a piston arranged for reciprocating movement in a cylinder in response to fluid pressure applied to one side of said piston by a pressurized fluid and a return force applied to another side of said piston by a pushing means for engaging the other end portion of said rocker member and said another side of said piston, a fluid system for supplying said pressurized fluid to said cylinder on said one side of said piston, and control means for controlling said fluid pressure in response to the speed of said motor vehicle;

wherein said fluid pressure causes said cam follower to provide said resistance force at least when said cam follower is received in said centering depression;

and wherein said control means comprises a sensor for sensing said fluid pressure, a sensor for sensing said vehicle speed and processing means for controlling the pressure of said fluid supplied to said cylinder on said one side of the piston in response to an output of said pressure sensor and an output of said speed sensor.

16. An apparatus according to claim 15, wherein said pushing means comprises a spring member such that at least a portion of said return force comprises a spring force provided by said spring member.

17. An apparatus according to claim 16, wherein said motor vehicle has an hydraulic power steering system, and wherein said fluid system comprises an hydraulic system in fluid communication with said power steering system.

18. An apparatus according to claim 15, wherein said pushing means comprises a rigid pushing member extending between said other rocker member end portion and said another side of said piston.

19. An apparatus according to claim 18, wherein said motor vehicle has an air brake system, and wherein said fluid system comprises a pneumatic system in fluid communication with said air brake system.

20. An apparatus according to claim 15, wherein said cam surface has opposite extensions each of which extends from a corresponding side of said centering depression and the shape of which is such that when it is in contact with said follower member, said cam member and said follower member are biased relative to each other by a return force tending to return said follower member to said seated position in said centering depression.

* * * * *